March 12, 1963 W. K. LEWIS 3,080,855
FURNACE FLUE GAS COMPOSITION CONTROL
Filed April 12, 1960 2 Sheets-Sheet 1

Warren K. Lewis Inventor

By

*Henry Berks* Patent Attorney

March 12, 1963 W. K. LEWIS 3,080,855
FURNACE FLUE GAS COMPOSITION CONTROL
Filed April 12, 1960 2 Sheets-Sheet 2

Warren K. Lewis Inventor
By *Henry Berk* Patent Attorney

United States Patent Office 3,080,855
Patented Mar. 12, 1963

3,080,855
FURNACE FLUE GAS COMPOSITION CONTROL
Warren K. Lewis, Newton, Mass., assignor to Esso Research and Engineering Company, a corporation of Delaware
Filed Apr. 12, 1960, Ser. No. 21,704
7 Claims. (Cl. 122—4)

This invention relates to vapor generating and heating furnace construction and operation for controlling the composition of hot combustion gases flowing from a fuel combustion and radiant heat chamber to a convection heating chamber of the furnace. The method and means set forth are applicable for generating steam in a water boiler furnace and also for heating organic liquids and vapors, such as petroleum oil and gaseous hydrocarbons, in pipe still furnaces. It has particular advantages in using fuels that form corrosive gaseous $SO_3$.

In accordance with the present invention, the furnace employed comprises a primary combustion chamber for burning of the fuel. Heat from the combustion gases in the chamber is transmitted to heat absorption conduits and surface largely as radiant heat. The combustion gases leaving the combustion chamber and sufficiently lowered in temperature are made to contact a mixture of $Fe_2O_3$ and $Fe_3O_4$ particles inserted in the path of the gases passing from the combustion chamber to a convection chamber in the furnace. The $Fe_2O_3$ and $Fe_3O_4$ mixture of particles may be used in the form of a relatively shallow fluidized solids bed which is positioned to have a controlled temperature, preferably in the range of about 1500° to 1800° F., and to prevent excessive heating of metallic tubular conduits on sudden changes of load and to maintain the iron oxides in suitable fluidizable condition.

It is desirable to have furnaces constructed in a manner which avoids danger of overheating tubes which are during operation exposed to radiant heat and temperatures above 1800° F. The iron oxide solids employed in controlling the composition of flue gas are capable of storing heat, but by having these solids properly located in a furnace burnout of the tubes is prevented. The metal tubes exposed to high temperatures can be spaced and insulated from the iron oxide solids. A shallow bed of the iron oxide solids, e.g., 2 to 4 feet deep, can be spaced from the fuel burners located in the combustion chamber and radiant heat absorbing wall tubes are not in contact with said solids. The iron oxide solids maintained at a temperature of 1500° to 1800° F. during operation of the furnace effect the desired reactions of the flue gas components.

Normally in a combustion of fuels with air injected into a combustion chamber of a furnace complete mixing and combustion is difficult to obtain even in a very large combustion chamber. As a consequence, the flue gas formed is a nonuniform mixture of gaseous $H_2O$, $CO_2$, $H_2$, $CO$, $N_2$, unreacted hydrocarbon, $SO_2$, $SO_3$, and uncombined $O_2$. To minimize the loss of fuel heating value, caused by incomplete mixing and combustion, it has been common practice to use up to 10% or more excess air over the theoretical amount needed for complete combustion even at the losses thus incurred in furnace capacity, loss of sensible heat in waste flue gas, and power used in creating a draft (forced or induced).

In the practice of the present invention, flue gas from the combustion zone or chamber contacts the mixture of $Fe_2O_3$ and $Fe_3O_4$ as a nonuniform mixture of partially and completely oxidized compounds with uncombined oxygen and $SO_3$ present on an average just sufficient to complete combustion and convert the $SO_3$ to $SO_2$. The $Fe_2O_3$ reacts with $CO$, $H_2$, and unreacted oxidizable components, e.g., hydrocarbon and sulfur compounds to obtain their oxidation to $CO_2$, gaseous $H_2O$, and $SO_2$. In these reactions $Fe_3O_4$ is formed by abstraction of oxygen from the $Fe_2O_3$. The $Fe_3O_4$ combines with free oxygen and oxygen that is combined with sulfur in $SO_3$. These reactions take place simultaneously under the set forth conditions with a relatively small amount of $Fe_2O_3$ and $Fe_3O_4$ solids since the conversion of the iron oxides is reversible, and fortunately both the preferential oxidation to gaseous $H_2O$ and $CO_2$ and preferential reduction of $SO_3$ to $SO_2$ take place in the presence of these solids.

In carrying out the preferential reactions noted, complete mixing of the flue gas in a deep dense fluidized solids bed is not necessary. Adequate contact of the flue gas with the solids is obtained when the gas carries the solids in suspension and is made to undergo a separation as in a cyclone separator.

Automatic controls can be achieved by various means. For instance, a sample of the solids can be circulated through a monitoring device which measures magnetic permeability and adjusts the air supply for combustion if the $Fe_2O_3$ to $Fe_3O_4$ ratio is changed to outside set limits.

An explanation of embodiments of the invention will be made with reference to the accompanying drawing which shows a sectional elevation of furnace structures of two different types.

Figure 1:
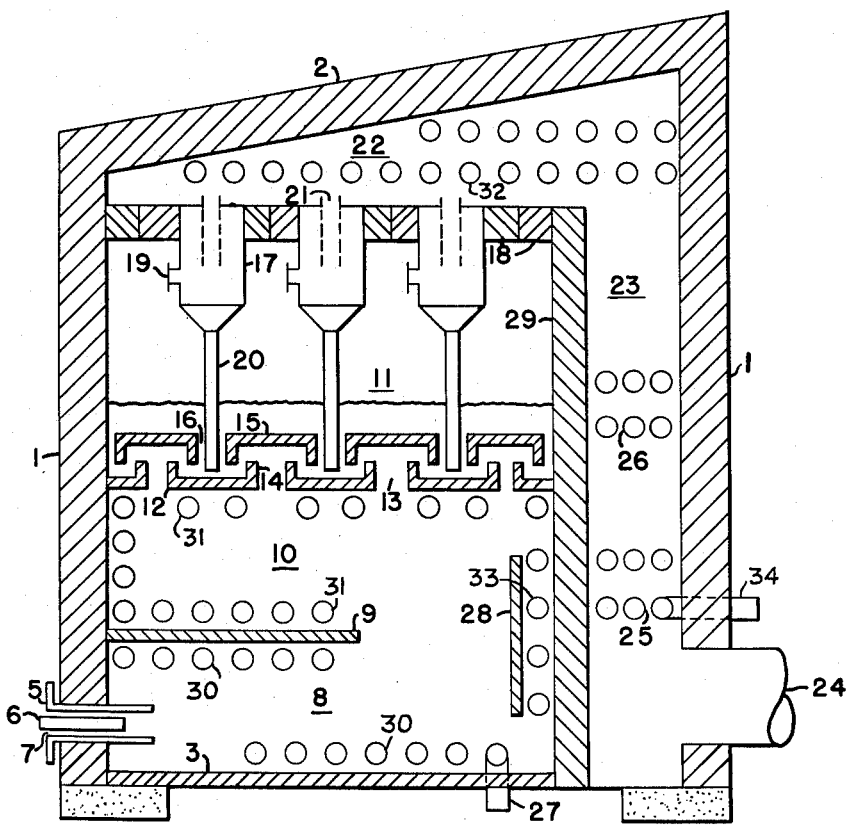
FIG. 1 shows schematically a furnace which can be used for vapor generating and/or heating of substances, such as mineral oil, hydrocarbon vapors, water, or steam, passed through tubular conduits.

The heater or furnace shown in FIG. 1 comprises insulated side walls 1, roof 2 and floor 3.

A burner 5 is located in the lower part of a side wall for injecting atomized fuel oil through atomizer 6 with air from line 7 into a combustion chamber 8 which is disposed between the floor 3 and a horizontally extended baffle 9. Baffle 9 which extends only part of the way across the furnace is constructed of heat resistant refractory material and is used for moderating the velocity of the combustion gases in an upward direction while at the same time providing for increased cooling of the combustion gases through removal of radiant heat by tubes 30 located in the lower portion of the furnace. Vertical baffle 28 is of similar construction as baffle 9 and provides increased cooling of the combustion gases through removal of radiant heat by tubes 33 located behind baffle 28.

The hot combustion gases pass up into a less intense heating section 10, which at its periphery has arranged radiant heat receiving tubes 31.

Above section 10 is disposed a chamber 11 which interconnects between the radiant heat section 10 of the furnace and the roof convection section 22 of the furnace which starts in the upper part of the furnace below the furnace roof 2.

The floor of chamber 11 is made up of refractory support members 12 which serve as trays to retain $Fe_2O_3$ and $Fe_3O_4$ solid particles above them. The support members 12 have cylindrical holes or rectangular slots 13 fitted with hollow vertical members 14 to serve as passageways for the gases that are to be made to rise upwardly from the radiant heat section 10. Above the vertical members 14 are cap members 15 which make the gases disperse downwardly and outwardly as they enter into contact with the iron oxide solids in chamber 11. In a manner similar to bubble caps, the members 13, 14, and 15 serve to prevent a downflow of solid particles into the radiant heat and combustion chambers below.

The hollow upright members 14 can be made high enough to permit an accumulation of the iron oxide solids within the well portions 16 between the cap members 15.

A sufficient number of the ports 13 can be provided for distributing the combustion gases and making them flow into chamber 11 without unduly impeding their velocity in the relatively narrow combustion sections 10 and 8 where the linear velocity is about 20 to 30 ft. per second. The velocity of gas through chamber 11 may be kept to below 5 ft. per second. Beyond chamber 11, the gas velocity is increased to a much higher level again for convection heating in section 22.

A number of cyclone or equivalent gas-from-solid centrifugal separators 17 are arranged in suspension from a refractory holding structure 18 for removing solid particles from the gases which are forced to leave the chamber 11 by passing into each of the separators through a tangential inlet 19. The separated solids are made to flow back down through the dip legs 20 of the separators into the wells 16 at the bottom of chamber 11. The gases separated from the solid particles in the separators 17 flow out through outlets 21 to continue their course of flow through a convention section 22 in the upper part of the furnace. In convection section 22 the hot gases deliver convection heat to rows of roof tubes 32 arranged in this section.

After the hot gases have given up heat to convection tubes 32 they may be withdrawn from the furnace to a stack, but as shown in FIG. 1, the gases leaving the convection section 22 are made to pass through an auxiliary convection chamber 23 between bridge wall 29 and furnace wall 1 to transfer heat to heat economizing or preheating tubes 25 and 26 located in this auxiliary convection section. The gases are finally led through a duct 24 to a stack or chimney.

Various known means may be used in connection with the duct or flue gas outlet for removing any entrained fine particles, e.g., cinder and soot extractors. Such devices may also serve as fans for propelling the flue gas. Additional gas cleaning devices may also be employed; also, air preheating exchangers.

The present invention is not concerned with any particular shape of furnace, arrangement of its heating tubes or accessories except insofar as they might have a bearing on the use of the mixed $Fe_2O_3$-$Fe_3O_4$ solids in an appropriate place for contact with the combustion gases on their way from combustion and radiant heat zones of the furnace to a convection heating section of the furnace.

Associated with the desired chemical reactions of oxidation and reduction that are effected in the interposed treating chamber 11, there are physical improvements from control of heat liberation and elimination of temperature variations.

The liquid and vapors thereof are circulated through the tubes located in various sections of the furnace. Usually in heating oil and the generated oil vapors, the oil feed is passed into the tubes comprising a lower bank of tubes 25 in the auxiliary convection section 23 from a feed line 34 then into a higher bank of convection tubes 26 and for final convection heating into the roof tubes 32 located in the highest temperature convection section 22. From the tubes in the convection section 22 the vapors are circulated into the wall tubes arranged in the radiant heat sections 10 and 8 to receive heating to a maximum temperature, after which the heated vapors leave the furnace through a transfer line 27. Various arrangements of the tubes can be made in the combustion chamber and radiant heat sections o fthe furnace, but usually it is desirable to prevent impingement of the flame directly on the tubes. Accordingly, some of the radiant heat tubes may be placed in rows adjacent the floor 3 of the furnace. In placing tubes along a wall of the radiant heat section facing the burner, a refractory screen or baffle 28 may be provided for such tubes to prevent direct exposure of thsee tubes to the flame.

Figure 2:
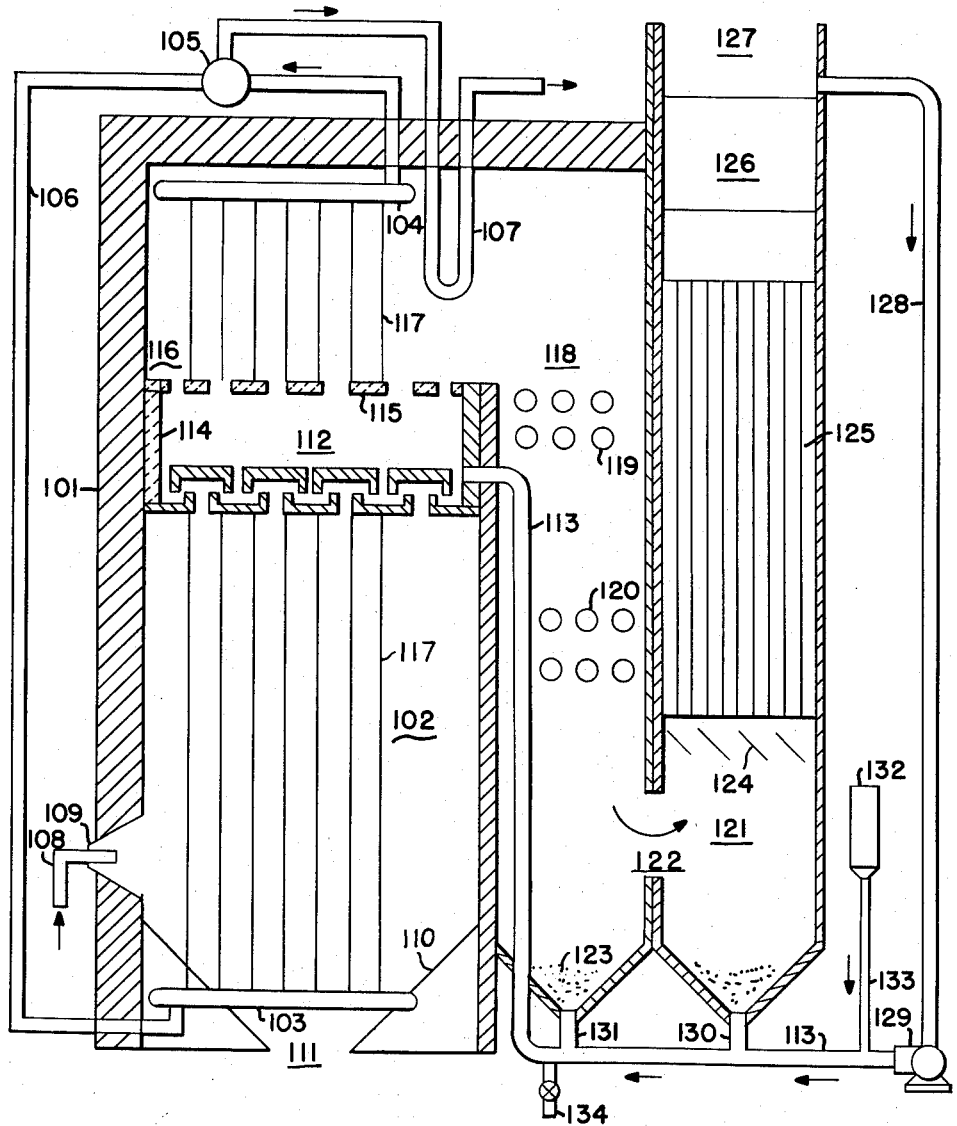
FIG. 2 shows schematically an upfired water boiler furnace for high pressure steam generation.

Referring to the modern type water tube boiler furnace shown in FIG. 2 diagrammatically, the furnace is enclosed with a side wall 101 and has a primary combustion and radiant heat chamber 102 in which are disposed vertical wall tubes 117 up through which water and steam are circulated from a lower header 103 to an upper header 104. The steam from the upper header 104 is passed to the water separator drum 105, whence liquid water is returned to the lower header 103 by downcomer line 106. Steam from the upper part of the separator 105 is passed through a superheater 107 which is located in a convection heating zone. A carbonaceous fuel, e.g., a heavy petroleum fuel oil containing sulfur, is fed preheated through line 108 to a burner 109 where it can be atomized with preheated air or air with steam. Several such burners may be arranged to inject the combustible fuel oil into the combustion chamber 102. The bottom floor 110 of the combustion chamber may be cone shaped to aid in removal of solid particles to outlet 111.

At the top of the combustion chamber 102 is a refractory arch or grid of brickwork spaced to permit flow of hot combustion products from the combustion zone 102 into a solids mixing zone 112. In this zone the hot gases are intermingled with $Fe_2O_3$ and $Fe_3O_4$ bearing solid particles conveyed pneumatically into this zone from duct 113. These particles may be suspended in recycled flue gas of lower temperature than the combustion gases entering the zone 112. The zone 112 may be surrounded by refractory sides 114 to protect wall tubes, if desired. At the top of the mixing zone 112 are spaced refractory bricks 115, or the like, for giving the solids more holdup and higher concentration in the mixing zone. Other means for trapping the solids to increase their concentration in the mixing zone may be used, e.g., centrifugal cyclone separators. The gases with suspended solids pass up through the spaces between the refractory baffles of bricks 115 to enter the convection chamber zone 116, therein imparting heat by the convection to the upper extension of the wall tubes 117. Then the gases carrying in suspension the solids flow past the superheater coil 107 located where the convection zone 116 communicates with the adjacent convection zone 118 where the gases pass downwardly.

Wall tubes may be disposed in the convection chamber 118 or banks of horizontal tubes 119 and 120, or both wall tubes and such horizontal tubes. The banks of tubes may be used as economizer tubes, e.g., bank 120, and reheating tubes, bank 119, etc.

Near the bottom of the convection chamber 118 the gases make an abrupt turn into a separator, e.g., cyclone separator or centrifugal separator 121 through a passageway 122. In this change of direction, some of the solids precipitate out into a bin 123. On entering the separator 121 the gases may be made to flow tangentially into the separator 121 to give the gases a spiralling flow which aids in precipitating out particles. In a cyclone type separator, baffles 124 help to deflect entrained solid particles from the gases proceeding up through an air preheater 125. As the gases continue on toward the chimney or stack 127 they may be passed through a dust extractor 126 and other conventional equipment, e.g., forced draft fan, etc. Some of the flue gas on the way to the stack can be withdrawn through a duct 128 to be recycled by fan 129 to duct 113, thus acting as carrier gas for solids which are withdrawn from the separator 121 through line 130 and withdrawn from the bin 123 through line 131. A fresh supply of solids can be added from a hopper 132 through line 133 to line 113. A drawoff line 134 may be provided for withdrawal of samples to be analyzed and for withdrawal of solids for replacement thereof. Various other equipment, not shown, can be used for controls, analysis and measurements.

In addition to the described method of contacting the $Fe_2O_3$-$Fe_3O_4$ solids with the furnace gases as they leave the combustion chamber, other methods may be employed. The $Fe_2O_3$-$Fe_3O_4$ may be used mixed with refractory solids, such as magnesium oxide and aluminum silicates. Such refractory solids may be impregnated with iron salts then treated to have such solids contain $Fe_2O_3$ and $Fe_3O_4$. Such solids can be suspended as finely divided particles in recycled flue gas that is mixed with the hot combustion gases.

A technique of carrying out the invented process is illustrated by the following example:

A sulfur-containing fuel oil is atomized with preheated air of theoretical required proportion into a combustion zone of a water boiler furnace to obtain a combustion gas temperature of 2500° F. therein, vertical heat water tubes being disposed next to the interior of the refractory walls so that they are exposed to radiant heat. The combustion gases are made to pass through apertures of an arch at the end of the combustion zone where the gases leave the combustion zone to enter a convection zone or chamber of the furnace.

Before addition of solids ($Fe_2O_3$-$Fe_3O_4$) to the gases leaving the combustion chamber, the flue gases going to the stack on analysis show the presence of incompletely reacted substances as for instance on a mol percent basis, e.g., $1O_2$, $4CO$, $2H_2$, also, 30 p.p.m. $SO_3$.

$Fe_2O_3$-$Fe_3O_4$ containing solids, such as settled out in a flue gas centrifugal separator, and of 10 to 100 mesh size, are then suspended in a stream of flue gas which is recycled for injection into the furnace above the arch for dispersion into the hot combustion gases where a temperature in the range of 1500° to 1800° F. is maintained. The proportion of solids is added to supply the amount of oxygen required for complete oxidation of the CO and $H_2$ from $Fe_2O_3$ in the solids taking into account the formation of $Fe_2O_3$ by reaction of the $Fe_3O_4$ with free $O_2$, $SO_3$, and $H_2O$ in the gas and a need for an additional amount of solids to insure adequate contact. Thus, for each 1 lb. fuel burned, 1.5 lbs. of the mixed iron oxide solids, containing 50% $Fe_2O_3$ and 50% $Fe_3O_4$, present in said solids inventory of the system gives protection as high as a 10% variation of the air/fuel ratio from theoretical for 6 minutes. This permits adjustments in the amounts of the iron oxides and of air supplied to obtain the desired balanced effects. When proper balancing of these effects are obtained, the flue gas going to the chimney becomes substantially free of $O_2$, CO, $H_2$ and has an inconsequential $SO_3$ content, e.g., below 1 p.p.m.

It has been shown that even with ordinary difficulties of gas mixing in the combustion zone of a furnace where temperatures of the combustion gases are in the range of 2500° to 3500° F., these gases can be cooled to appropriate temperatures of about 1500° to 1800° F. for contacting with the mixed $Fe_2O_3$-$Fe_3O_4$ solids which have good mixing in a dense fluidized bed of the solids or as a dispersed phase to give the desired reactions. At the temperatures of 1500° to 1800° F. the iron oxide solids, e.g., of 10 to 400 micron size, remain fluidizable and reactive for completing combustion of combustible gas components and reducing the $SO_3$ content of the flue gas.

A number of advantages are obtained through use of the procedure described in addition to the lessened amount of heat lost in stack gases and lessening of corrosion otherwise caused, e.g., by $SO_3$, in ducts leading to the chimney, particularly in an air preheater section. The iron oxide bearing solids effect removal of other corrosive contaminants, such as vanadium and decomposition of nitrogen oxides. Also, they can scour attritable deposits from metal surfaces.

The invention described is claimed as follows:

1. In operating a furnace having a combustion zone in which a carbonaceous fuel is burned with air to produce hot combustion gases containing $N_2$, $O_2$, $CO_2$, $H_2O$, $SO_2$, $SO_3$ with combustible CO, $H_2$ and hydrocarbon, the improvement which comprises burning the fuel with a minimum excess of air in said combustion zone, passing resulting hot gaseous combustion products from said combustion zone cooled to temperatures in the range of about 1500° to 1800° F. into contact with solids consisting essentially of $Fe_2O_3$ and $F_3O_4$ to effect oxidation of combustible components by the $Fe_2O_3$ and reduction of the $SO_3$ to $SO_2$ in the gas by $Fe_3O_4$, then passing the resulting gas into a convection zone to heat conduits through which fluid receiving heat is circulated.

2. In operating a water tube boiler furnace having a combustion zone in which a sulfur containing oil fuel is burned with air to produce radiant heat and hot gaseous combustion products containing $N_2$, $O_2$, $CO_2$, $H_2O$, $SO_2$, $SO_3$, and combustible CO, $H_2$, and hydrocarbon components, the improvement which comprises burning the fuel with nearly a theoretical amount of air in said combustion zone having disposed therein heat exchange conduits through which water and steam are circulated, passing said gaseous combustion products lowered in temperature from said combustion zone into a mixing zone wherein particles consisting essentially of $Fe_2O_3$ and $Fe_3O_4$ are mixed and suspended in said hot gaseous products to effect reactions of oxidation and reduction, said combustible components being oxidized to $CO_2$ and $H_2O$ while the $SO_3$ component is reduced to $SO_2$, then passing the hot gaseous products thus treated in said mixing zone into a convection zone for contact with tubular conduits through which steam and water are circulated.

3. In the method of claim 2, the step of carrying the $Fe_2O_3$ and $Fe_3O_4$ bearing particles suspended in the hot gaseous products to a separation zone where the solids are separated from the gas after passing through the convection zone and returning the separated solids to said mixing zone.

4. In the method of claim 2, the step of concentrating the $Fe_2O_3$ and $Fe_3O_4$ solids in the mixing zone by separating said solids from the gases leaving the mixing zone and returning these separated solids to said mixing zone.

5. In the method of claim 2, the step of cooling gases passed through the mixing zone by injecting recycled cooled flue gas thereto.

6. A method of operating a furnace wherein liquids and their vapors are passed through heat conducting tubular conduits, said furnace enclosing a combustion zone that receives a hydrocarbon fuel and air for combustion at one end to heat combustion product gas that gives off radiant heat to a number of said tubular conduits around the path of said hot gas flowing through the combustion zone and said furnace enclosing a convection heating zone in which a number of said tubular conduits are in the path of combustion product gas that leaves the combustion zone, which comprises burning amounts of fuel with a minimum excess of air in the combustion zone to make the combustion product gas that leaves the combustion zone contain free oxygen, CO, $H_2$ and hydrocarbon, cooling the combustion product gas that leaves the combustion zone to a temperature in the range of about 1500° to 1800° F., treating the thus cooled combustion product gas by intimate contact with $Fe_2O_3$ and $Fe_3O_4$ solids in a fluidized treating zone intermediate the combustion zone and the convection heating zone sufficiently to react the $Fe_3O_4$ with said free oxygen and the $Fe_2O_3$ with CO, $H_2$ and hydrocarbon in the gas before the gas is passed into said convection heating zone.

7. The method of claim 6, wherein the amount of air used varies from the amount required for complete combustion of the fuel to $CO_2$ and $H_2O$ by less than 10% and temperatures of the combustion product gas in the combustion zone are in the range of about 2500° to 3500° F.

References Cited in the file of this patent

UNITED STATES PATENTS

| | | |
|---|---|---|
| 2,412,809 | Harlow | Dec. 17, 1946 |
| 2,665,971 | Lewis et al. | Jan. 12, 1954 |
| 2,750,903 | | |
| 2,840,043 | | |
| 2,844,112 | | |
| 2,884,373 | | |
| 2,898,201 | | |
| 2,750,903 | Miller et al. | July 19, 1956 |
| 2,840,043 | Durham | June 24, 1958 |
| 2,844,112 | Muller | July 22, 1958 |
| 2,884,373 | Bailey | Apr. 28, 1959 |
| 2,898,201 | Hayes | Aug. 4, 1959 |

FOREIGN PATENTS

| | | |
|---|---|---|
| 640,699 | Great Britain | July 26, 1950 |
| 776,791 | Great Britain | June 12, 1957 |